(12) United States Patent
Hocquet et al.

(10) Patent No.: US 12,650,725 B2
(45) Date of Patent: Jun. 9, 2026

(54) SEMICONDUCTOR DEVICE OPERATING MODES MANAGEMENT

(71) Applicant: E-PEAS, Louvain-la-Neuve (BE)

(72) Inventors: Cedric Hocquet, Louvain-la-Neuve (BE); Julien De Vos, Louvain-la-Neuve (BE); Geoffroy Gosset, Louvain-la-Neuve (BE)

(73) Assignee: E-PEAS, Louvain-la-Neuve (BE)

( * ) Notice: Subject to any disclaimer, the term of this patent is extended or adjusted under 35 U.S.C. 154(b) by 106 days.

(21) Appl. No.: 18/847,334

(22) PCT Filed: Mar. 7, 2023

(86) PCT No.: PCT/EP2023/055747
§ 371 (c)(1),
(2) Date: Sep. 16, 2024

(87) PCT Pub. No.: WO2023/174756
PCT Pub. Date: Sep. 21, 2023

(65) Prior Publication Data
US 2025/0208690 A1     Jun. 26, 2025

(30) Foreign Application Priority Data
Mar. 18, 2022    (EP) ..................................... 22162896

(51) Int. Cl.
*G06F 1/32* (2019.01)
*G06F 1/3234* (2019.01)
*G06F 1/324* (2019.01)
*G06F 1/3296* (2019.01)

(52) U.S. Cl.
CPC ............ *G06F 1/3275* (2013.01); *G06F 1/324* (2013.01); *G06F 1/3296* (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 5,925,133 A | 7/1999 | Buxton et al. | |
| 2009/0089599 A1 | 4/2009 | Westwick et al. | |
| 2015/0067363 A1* | 3/2015 | Jouin ........................ | G06F 1/06 713/320 |
| 2015/0127122 A1* | 5/2015 | Kwon ................... | G06F 1/3206 700/22 |
| 2019/0079573 A1 | 3/2019 | Hanson et al. | |

OTHER PUBLICATIONS

Int'l Search Report for PCT/EP2023/055747, dated May 25, 2023.

* cited by examiner

*Primary Examiner* — Keshab R Pandey
(74) *Attorney, Agent, or Firm* — MaxGoLaw PLLC

(57) ABSTRACT

A semiconductor device (10) is provided having several operating modes, a core (12) adapted for executing a software application (14), said software application (14) being adapted for selecting the configuration of one or more of peripherals (60) and for issuing a sleep request. A Power Management Unit (PMU) (130), having a first input port (132) is provided for receiving the configuration of one or more of the peripherals, a second input port (134) for receiving a sleep request from said core (12) executing said software application (14), and a control logic module (136) configured for, upon receiving said sleep request, selecting an operating mode among the several operating modes, in dependence of the configuration of one or more of the peripherals, and to a method of operating said device.

16 Claims, 7 Drawing Sheets

18

60

Bit 0 : 0=disable,
1=enable
peripheral

Bit 1, 2: 00=clock
gating, 01=use
clock 1, 10=use
clock 2

107

30

130

PMU

SLEEP REQUEST

170

SEMICONDUCTOR DEVICE OPERATING MODES MANAGEMENT

FIELD OF THE INVENTION

The invention relates to a semiconductor device having a plurality of operating modes, comprising a power management unit for selecting an operating mode among said plurality of operating modes, according to the needs of an application. The invention also relates to a method of operating said semiconductor device.

DESCRIPTION OF PRIOR ART

Document U.S. Pat. No. 8,975,916 discloses a core architecture comprising a digital subsystem, a clocking subsystem and power management subsystem. Power modes may be implemented and managed by the power management subsystem. Power modes are entered and exited based on power and processing requirements of the application. Power modes may be controlled by the CPU based on program execution or may be controlled by an external controller through writing to registers within the power subsystem.

Document US2009/089599 and US2019/0079573 for example, discloses a microcontroller including a processing unit having a normal power mode of operation and a low power mode of operation. The processing unit further has digital circuitry connected to the processing unit. Sleep mode is initiated by software, and the microcontroller and all components thereof are disabled.

Modern semiconductor devices, such as microcontrollers (MCUs) are usually partitioned in multiple domains containing analog and/or digital circuits that provide various functionalities. Each domain can usually be operated with a clock of varying frequency, can be clock gated, meaning that no clock signal reaches the domain, and/or can be power gated, meaning that no power is supplied to the domain. In order to save power, modern digital semiconductor devices usually have different operating modes implemented using a combination of clock scaling, clock gating and power scaling, power gating for the different domains. Usually, among the operating modes, there is an active mode (all domains are active and highest clock frequency is available), a sleep mode (some domains are clock gated) and a deep sleep mode (some domains are clock and power gated and/or some other domains run at a lower clock frequency). Thus, the available functionalities and performances of the semiconductor device vary with those modes. The user can select, by software, the lowest consuming mode that fits the application needs at any time. Those operating modes are vaguely defined by the core IP provider (like ARM) and they are usually specifically defined by MCU manufacturers. Usually, manufacturers define more than 3 operating modes, offering a finer grain power control. As the number of operating modes increases, and also the complexity of the MCUs, it becomes more and more complicated for the user to write software that sets the MCU in the proper mode at the proper time. For example, the user must generally control the clock generators and voltage generators, via multiple registers, to set them in such a state to allow the target mode of operation. This is often not easy to understand and apply. This usually results in a non-optimal power consumption because the user is not able to write the software properly and then the operating modes are not used properly.

SUMMARY OF THE INVENTION

It is an object of the present invention to provide a semiconductor device wherein the selection and the configuration of the operating modes for minimising the power consumption is simple and efficient.

The invention is defined by the independent claims. The dependent claims define advantageous embodiments.

According to a first aspect of the invention, there is provided a semiconductor device having a plurality of operating modes, comprising components required for the operation of the semiconductor device having each an operating condition selectable among a plurality of operating conditions (usually, but not limited to, service components such as voltage regulators or clock generators);

one or more peripherals each configured to provide a functionality to the semiconductor device (such as, but not exclusively, communication, timing, sensing or security functionalities), according to a selected configuration among one or more configurations;

a core adapted for executing a software application, said software application being adapted for selecting the configuration of one or more of said peripherals and for issuing a sleep request;

The semiconductor device further comprises a Power Management Unit (PMU), having a first input port for receiving the configuration of one or more of said peripherals, a second input port for receiving a sleep request from said core executing said software application, and a control logic module configured for, upon receiving said sleep request, selecting an operating mode among said plurality of operating modes, in dependence of the configuration of one or more of said peripherals.

Preferably, said in the semiconductor device, one or more of said peripherals comprise a Peripheral Control and Status Register (PCSR) comprising one or more bits, the one or more bits comprising a bit to set the peripheral in operational on or off state, and for providing status information regarding the peripheral, the semiconductor device comprising a first bus for exchanging data between said core and said one or more of said peripherals, said software application being adapted for selecting the configuration of one or more of said peripherals by sending data through said first bus.

In a first embodiment of the invention, in the semiconductor device, one or more of said peripherals comprise a clock input terminal for receiving one or more clocks; one of the said components of the semiconductor device is a clock generator module comprising one or more clock generators configured for producing and providing a clock to said clock input terminals of said one or more peripherals, and configured for receiving first commands to turn on or turn off each of the clock generators and/or to determine the frequency to be produced; and the PMU is configured for, upon receiving said sleep request, sending said first commands in dependence of said selected operating mode, for setting said semiconductor device in said selected operating mode.

In a second embodiment of the invention, the semiconductor device comprises one or more power domain, each comprising one or more of said peripherals; one or more of said one or more power domains further comprise a voltage input terminal for receiving a voltage for powering the power domain; one of the said components of the semiconductor device is a voltage generator module comprising one or more voltage generators and voltage output terminals, configured each for producing and providing one voltage to at least one of said voltage input terminal for powering said one or more power domains, and configured for receiving second commands to turn on or turn off each of the voltage generators and/or to determine the voltage to be produced;

the PMU is configured for, upon receiving said sleep request, sending said second commands in dependence of said selected operating mode, for setting said semiconductor device in said selected operating mode.

In said embodiments of the invention, one wire for each of the clock generators may be provided between the PMU and the clock generator for sending said first commands.

In said embodiments of the invention, a second bus may be provided for exchanging data between said PMU and said clock generator module, said PMU and said clock generator module being configured for sending and receiving, respectively, said first commands through said second bus.

In said second embodiment of the invention, one wire for each of the voltage generators may be provided between the PMU and the clock generator for sending said second commands.

In said second embodiment of the invention, a second bus may be provided for exchanging data between said PMU and said voltage generator module, said PMU and said voltage generator module being configured for sending and receiving, respectively, said second commands through said second bus.

Said first bus and said second bus may advantageously be interconnected so as to form a single bus.

In said second embodiment of the invention, a power gating switch being provided between a voltage output terminal and a voltage input terminal, for providing power to the power domain when the switch is on, and for gating the voltage provided to said power domain when the switch is off; said power gating switch (140) being controlled by third commands, the PMU (130) being configured for, upon receiving said sleep request, sending said third commands in dependence of said selected operating mode, for setting said semiconductor device (10) in said selected operating mode.

In said second embodiment of the invention, one or more of said power domains may comprise a frequency divider module configured for receiving a clock from the clock generator module and for dividing said clock into a plurality of clocks having different frequencies.

According to a second aspect of the invention, there is provided a method of operating a semiconductor device according the invention comprising the steps of:

1. said software application sets the configuration of one or more of said peripherals, according to the needs of the application;
2. said software application decides to transit to a different operating mode;
3. the PMU collects the configuration of at least one of said peripherals;
4. the control logic of the PMU selects the operating mode of the semiconductor device, in dependence of the configuration of one or more of said peripherals.

Preferably, in the method, the PMU sends said first and/or said second and/or said third commands in dependence of said selected operating mode.

FIELD OF THE INVENTION

The invention relates to a semiconductor device comprising one or more power domains, a clock generator module, optionally a voltage generator module, and a power management unit. The invention also relates to a method for managing the operating modes of the semiconductor device.

SHORT DESCRIPTION OF THE DRAWINGS

These and further aspects of the invention will be explained in greater detail by way of example and with reference to the accompanying drawings in which.

Same reference numbers on the different drawings designate same component or feature.

Figure 1:
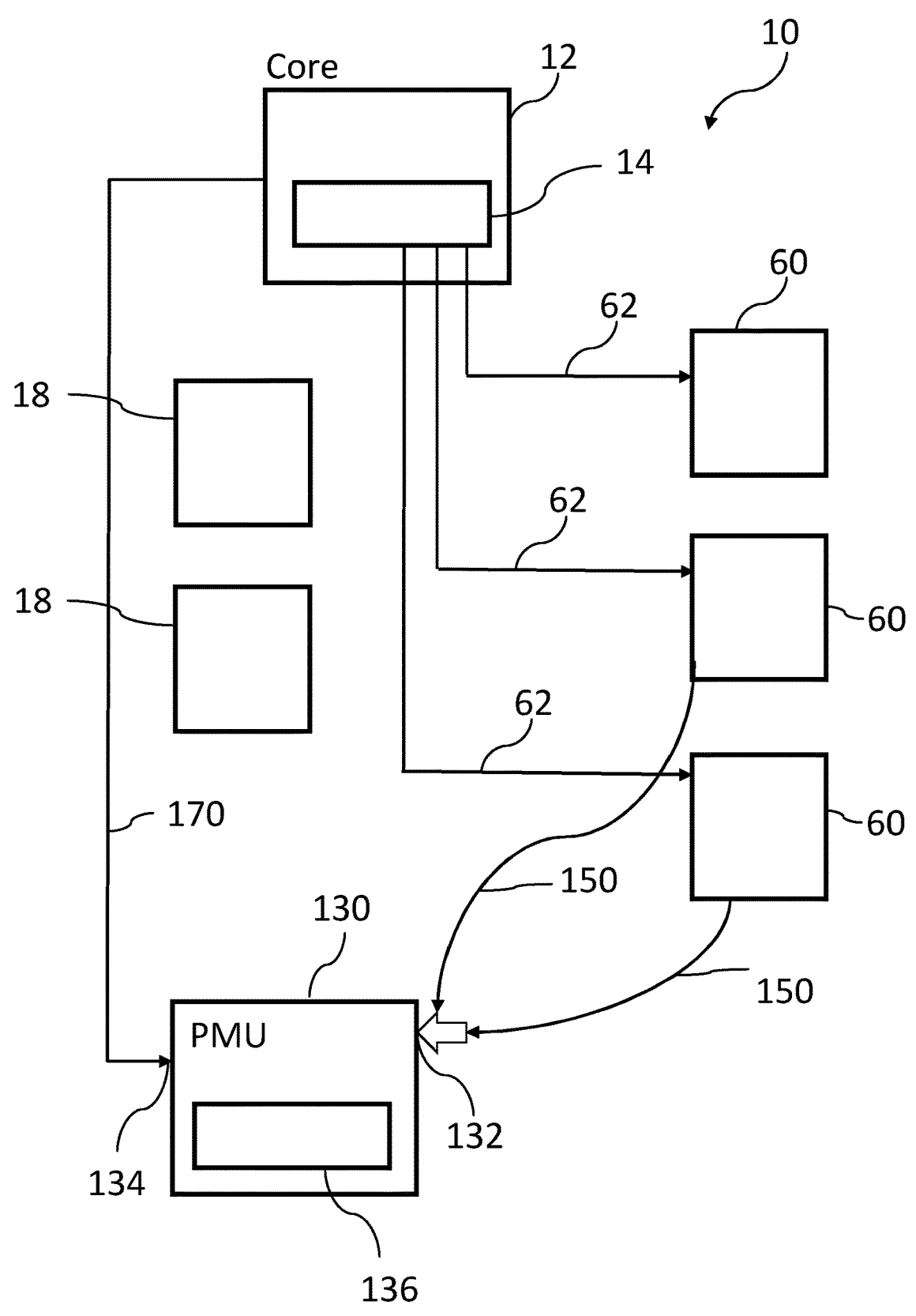
FIG. 1 represents schematically an embodiment of a semiconductor device according to the invention.

In the context of the present invention, a Control and Status Register (CSR) of a peripheral is a register comprising a plurality of bits indicating a logical value 0 or 1. The bits may be set to 0 or 1 for governing the behaviour of the peripheral comprising the CSR, and may be used and accessed by elements outside of the peripheral for assessing the status of the peripheral.

The drawings of the figures are neither drawn to scale nor proportioned. Generally, identical components are denoted by the same reference numerals in the figures. For the sake of clarity, not all components are represented on all the figures.

DETAILED DESCRIPTION OF EMBODIMENTS OF THE INVENTION

FIG. 1 represents schematically an example embodiment of a semiconductor device 10 according to the invention. As is well known, power consumption by an electronic circuit increases with the frequency of the clock used by the circuit, and with the square of the voltage applied to the circuit. Therefore, it is known to vary (reduce) the frequency of the clock, and the voltage of the power applied to a circuit. The semiconductor device 10 according to the invention is subdivided in different parts, which comprise:

a core 12, which may be a processing unit having an architecture such as ARMv6 or ARMv7 or ARMv8 or RISC-V. A software application 14 may be executing on the core 12;

components 18 which are needed and operational when the semiconductor device is operated. These components 18 may comprise a power module for powering other parts of the device, or a clock module for providing clocks to other parts of the device.

peripherals 60 which may be operational or not, according to the needs of the application, and with different configurations regarding clock frequency and/or voltage in order to save power. The peripherals may perform a function for the semiconductor device such as the function of analog-to-digital conversion (ADC), Universal Asynchronous Receiver Transmitter (UART), Universal Serial Bus (USB), True Random Number Generator (TRNG), or other functions well known in the field of MCU and semiconductor devices in general;

a Power Management Unit (PMU) 130 for managing the operating modes.

In applications where the power consumption is critical, the semiconductor device may be operated according to different operating modes, such as Active, Run, Sleep, DeepSleep, Standby, Stop, Idle, Off, Shutdown. The operating modes may comprise, e.g., active mode, where all parts of the device are powered at the highest voltage, and clocked at the fastest clock;

a number of operating modes dedicated to what the application currently performs, e.g. acquiring at fast rate, when peripherals must be enabled and fast clocked, computing, when some peripherals may be disabled, acquiring at low rate, when some peripherals may be enabled at slow speed, communicating, when some communication peripherals are enabled, . . .

a number of operating modes dedicated to lower the power consumption a much as possible, where most peripherals are power gated and only a few stay enabled using a low frequency clock.

The software application 14 may interact with the peripherals for setting the peripheral in a particular selected configuration by sending a peripheral configuration signal 62. The peripheral configuration may comprise operational on or off state, a particular clock frequency to be used, or to select no clock, or to select a particular voltage, or to select no voltage at all. The software applications may decide to issue a sleep request 170. In some architecture, the sleep request 170 is part of the instruction set. The sleep request 170 may be transmitted by the core 12 to the PMU 130. When receiving the sleep request 170, the PMU 130 obtains the value of the configuration of the peripherals. An input port 132 is provided at the PMU 130 for receiving the values of the configuration of the peripherals 60. The PMU 130 comprises a control logic module 136 for receiving the values of the configurations and, upon receiving a sleep request, to determine the target operating mode to select for the semiconductor device 10 in dependence of the configurations of the peripherals 60.

Figure 2:
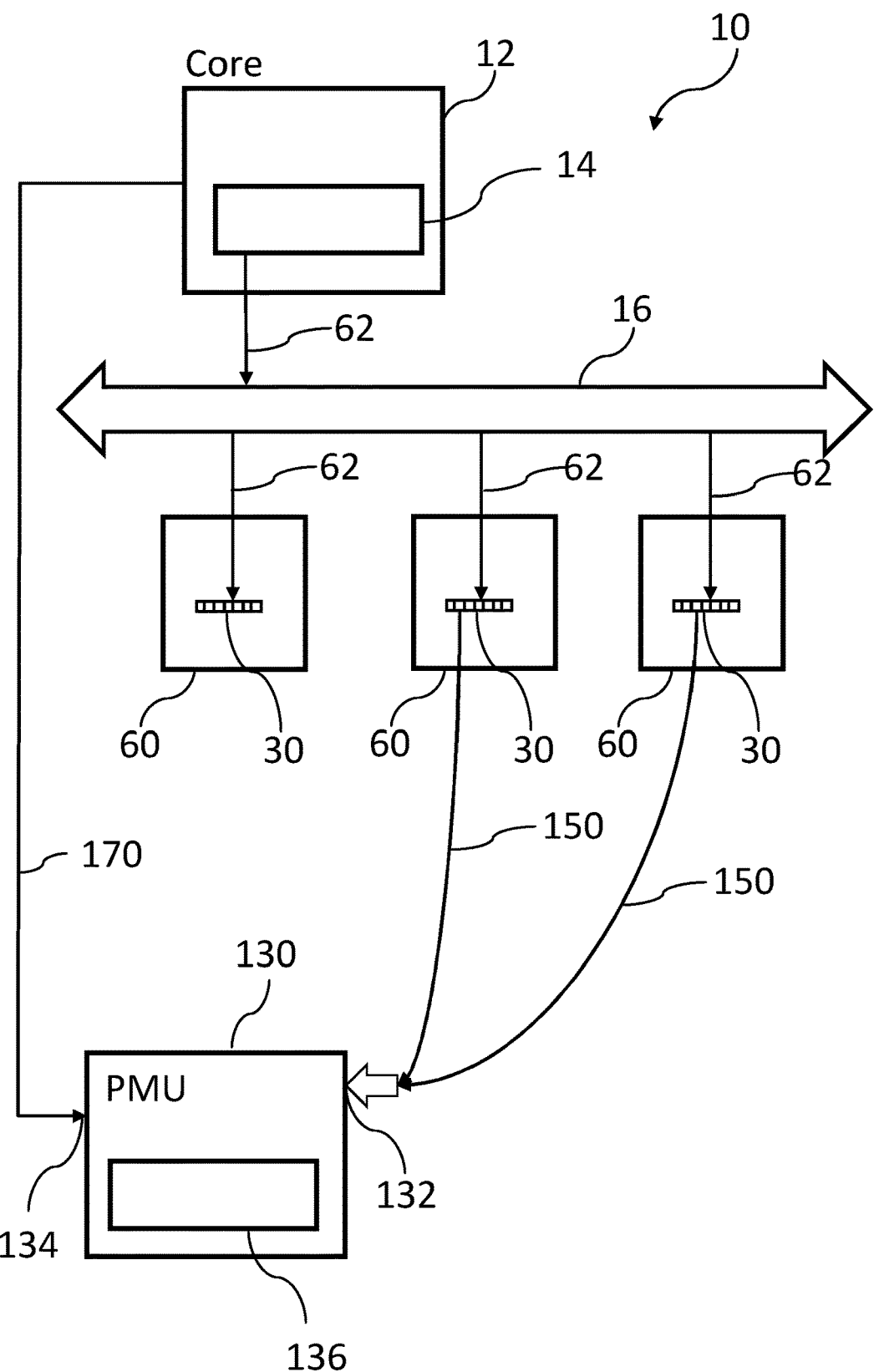
FIG. 2 represents schematically parts of another embodiment of a semiconductor device according to the invention.

FIG. 2 represents schematically parts of an example embodiment of a semiconductor device 10 according to the invention. In this embodiment, the peripherals 60 may comprise a Peripheral Control and Status Register (PCSR) 30, each having a number of bits enabling to control the peripheral, e.g. activating or deactivating the peripheral, or specifying the clock to be used for clocking the peripheral, or representing the status of the peripheral. The device 10 may comprise a first bus 16. The PCSRs may then be accessed in write mode through the first bus 16, e.g. by the core running an application program and deciding to enable or disable one or more of the peripherals, and to select a fast or a slow clock based on the needs of the application. The peripheral configuration signal 62 may then be sent through the first bus 16. The PMU 130 may obtain access of the values stored in the PCSR's through a set of wires 150 linking directly the PCSRs and the input port 132 of the PMU. These wires 150 may lead the contents of the bits of the PCSR's or a logical function thereof to the PMU 130. For the sake of clarity, these wires are not represented on FIG. 1, but symbolized as arrow 150.

Figure 3:
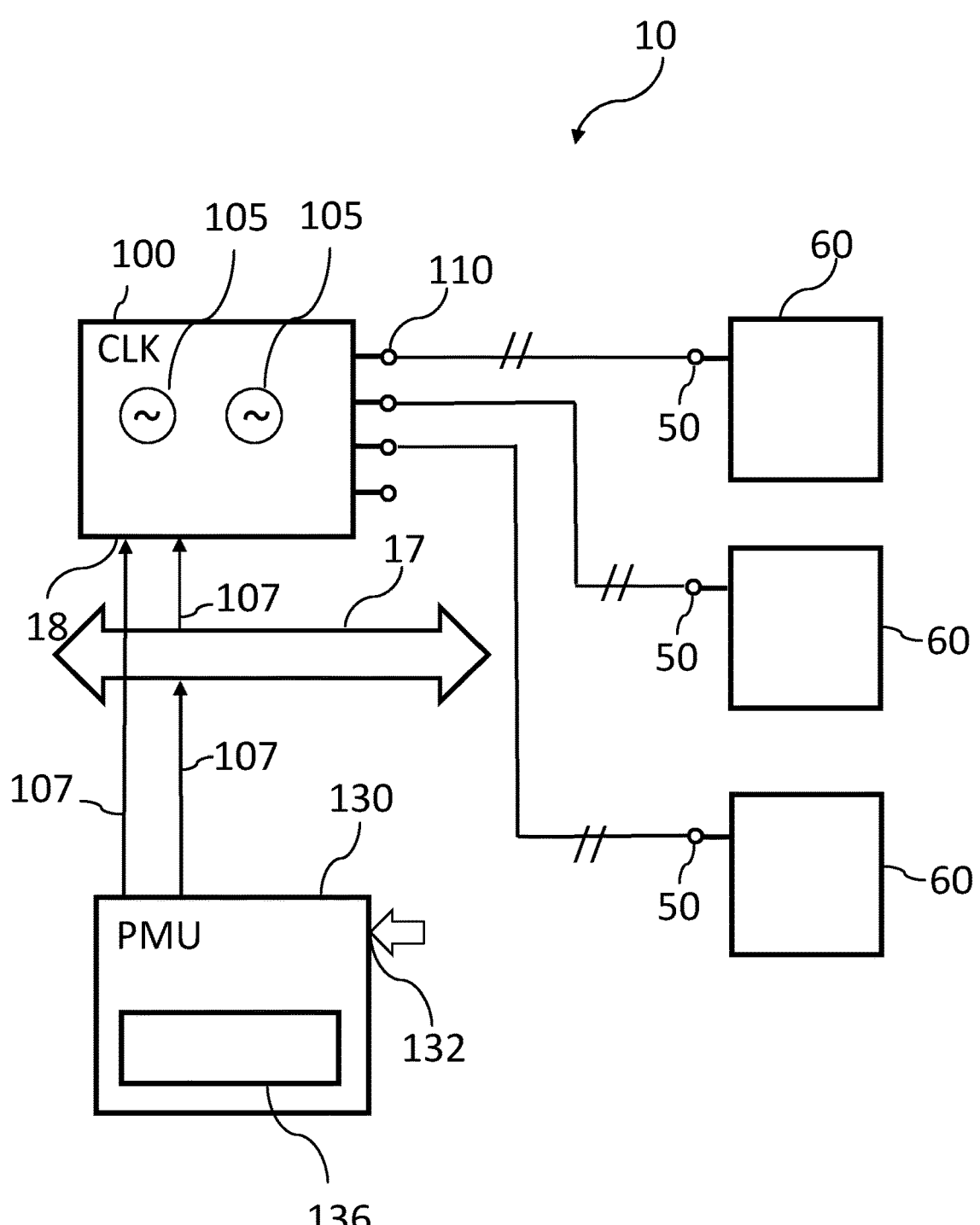
FIG. 3 represents schematically parts of an embodiment of a semiconductor device according to the invention comprising a clock generator module.

FIG. 3 represents schematically parts of an example embodiment of a semiconductor device 10 according to the invention. In this embodiment, the components 18 comprise a clock generator module 100 comprising one or more clock generators 105, configured for providing one or more clocks to the peripherals 60, a wire linking the clock output terminals 110 of the clock generator module 100 to the clock input terminals 50 of the peripherals. Although a single line is represented on FIG. 3, a plurality of wires may be provided, according to the numbers of clocks produced by the clock generator module 100, the symbol "//" representing that a plurality of wires may be present, the clock input terminals having then the same number of contact points. When the PMU 130 receives a sleep request and obtains the value of the configuration of the peripherals, the PMU selects an operating mode for the semiconductor device, and sends first commands 107 to the clock generator module 100, for setting the clock generators 105 according to the selected operating mode, e.g. in on or off state, or at a specified frequency. The PMU 130 may be configured for sending the first commands 107 directly through one or more wires. A wire may be provided for switching a clock generator 105 "on" of "off". The semiconductor device may also comprise a second bus 17 for exchanging data between the PMU and the components 18. The second bus 17 may be a dedicated bus or may be the first bus 16. The PMU 130 may then be configured for sending the first commands 107 directly through said second bus 17. The first commands may comprise a sequence of operations for safely transiting the semiconductor device 10 from one operating mode to another operating mode, e.g. providing periods for oscillators to settle, for voltage regulators to settle, for saving data, or generally for giving circuits a period of time for adapting to the new conditions.

Figure 4:
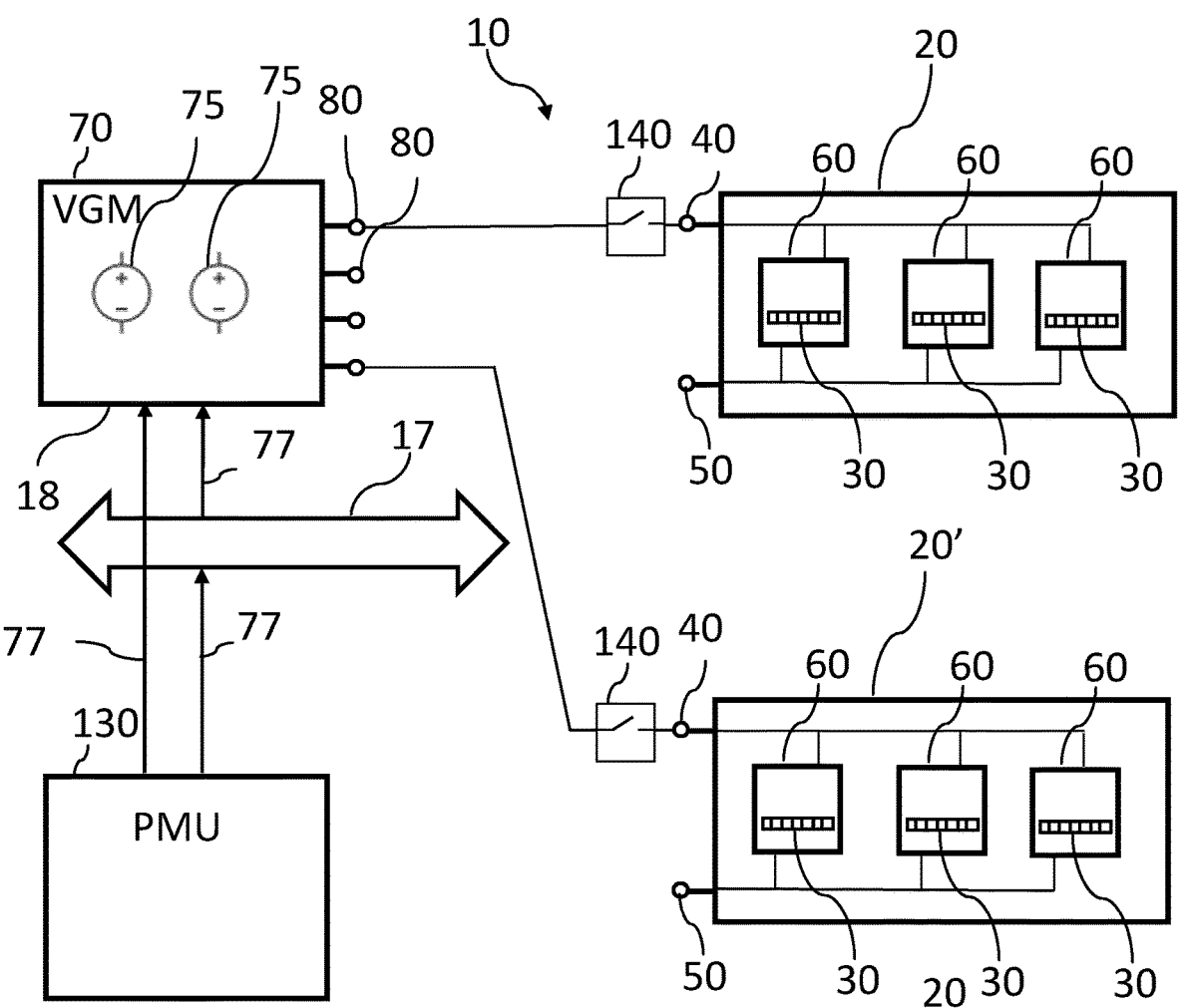
FIG. 4 represents schematically parts of an embodiment of a semiconductor device according to the invention comprising a voltage generator module.

FIG. 4 represents schematically parts of an example embodiment of a semiconductor device 10 according to the invention. In this embodiment, the components 18 comprise a Voltage Generator Module 70 comprising one or more voltage generators 75. In this embodiment, the semiconductor device comprises one or more power domains 20, 20'. A power domain may group one or more peripherals 60. A wire is provided for linking the voltage output terminals 80 of the VGM 70 to the voltage input terminals 40 of the power domains 20, 20', for receiving a voltage for powering the peripheral(s) 60 comprised in the power domain.

Each power domain may be provided with a clock input terminal 50, for receiving one or more clock for clocking the peripheral(s) comprised in the power domain, as described above.

For the sake of simplicity, two power domains, each having three peripherals are represented on the example of FIG. 4. However, the device may comprise any number of power domains, each having any number of peripherals 60, as suitable for the needs of the application.

As in the embodiment of FIG. 3, when the PMU 130 receives a sleep request and obtains the value of the configuration of the peripherals, the PMU selects an operating mode for the semiconductor device, and sends a second command 77 to the voltage generator module 70, for setting the voltage generators 75 according to the selected operating mode, e.g. in 'on' or 'off' state, or at a specified voltage. The PMU 130 may be configured for sending the second commands 77 directly through one or more wires. The semiconductor device may comprise a second bus 17 for exchanging data between the PMU and the components 18. The second bus 17 may be a dedicated bus or may be the first bus 16. The PMU 130 may then be configured for sending the second commands 77 directly through said second bus 17.

As discussed in relation to the embodiment of FIG. 3, the second commands 77 may also comprise a sequence of operations.

The device according to the embodiment of FIG. 4 may additionally comprise a power gating switch 140, for at least one of the power domains 20, 20', for enabling power supply to the power domain when in the "on" state, and for insulating the power domain from the VGM 70 when in the "off" state. The PMU 130 may, upon receiving said sleep request, determine the state to be set to the power gating switches 140 in dependence of the configuration of the peripherals, control the power gating switch by sending third commands, for configuring the semiconductor device in an operating mode dependent on the configurations of the peripherals.

Figure 5:
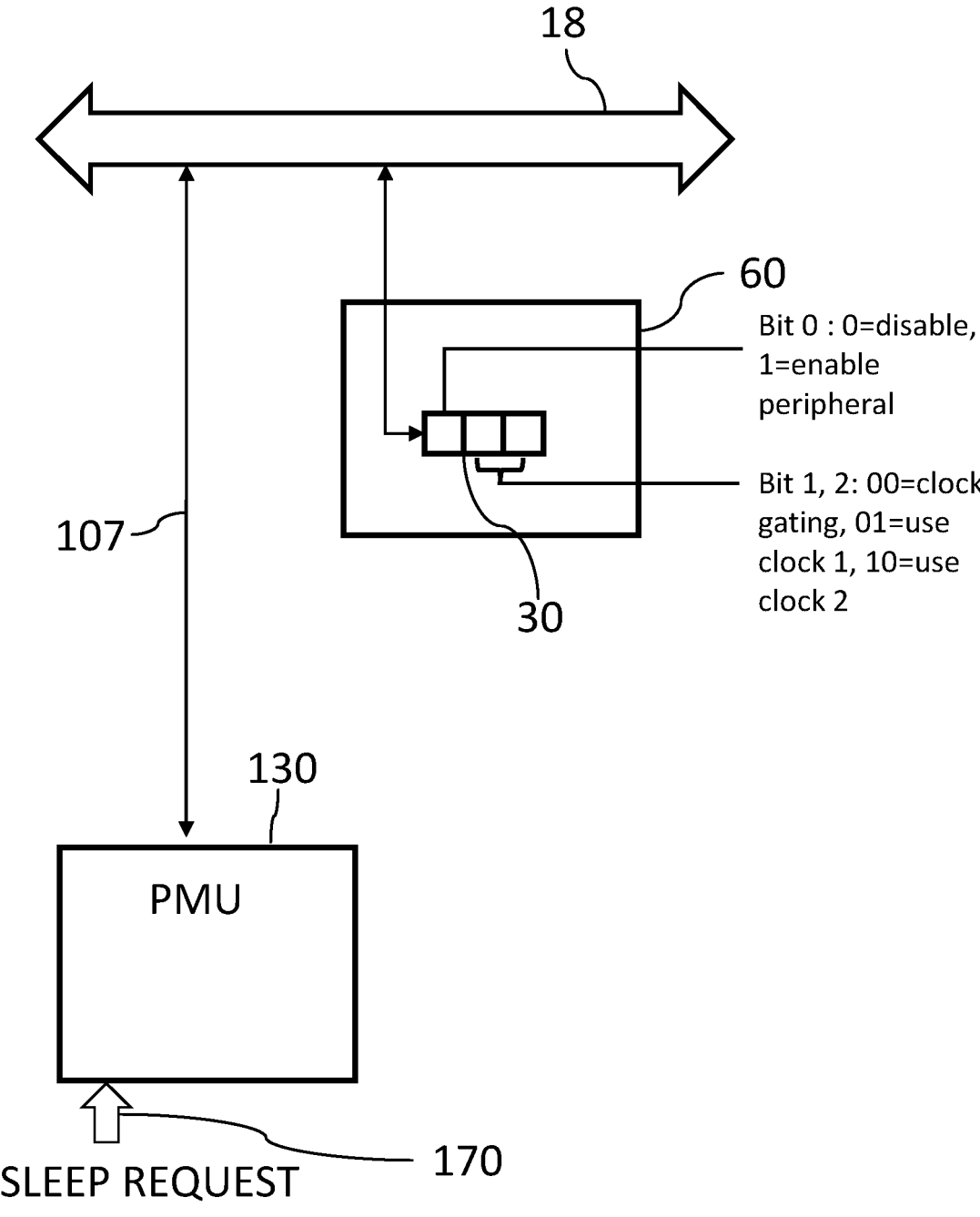
FIG. 5 represents schematically a detailed view of a peripheral in a device according to the invention.

FIG. 5 represents schematically a detailed view of a peripheral 60 in a device according to the invention. In the example the plurality of clocks comprises two clocks, a slow clock, and a fast clock. The peripheral 60 comprises a PCSR 30 having three bits. Bit 0 is dedicated to control the state of the peripheral, being disabled when equal to 0 and enabled when equal to 1. The bits 1 and 2 are used for selecting the clock to be used by the peripheral. When equal to 00, the clock is gated, i.e. no clock is admitted in the peripheral. When equal to 01, the slow clock is selected, and when equal to 10, the fast clock is selected. The 11 combination is not used. For example, the application program may decide that a particular peripheral is not needed in the future, and therefore set its enable/disable bit to zero. The application program may decide that another peripheral is needed but may run at a lower speed, because the function is not time-critical. Therefore, for saving power, the application program may set the enable bit, and write '01 to bits 1 and 2 for selecting the slow clock.

Figure 6:
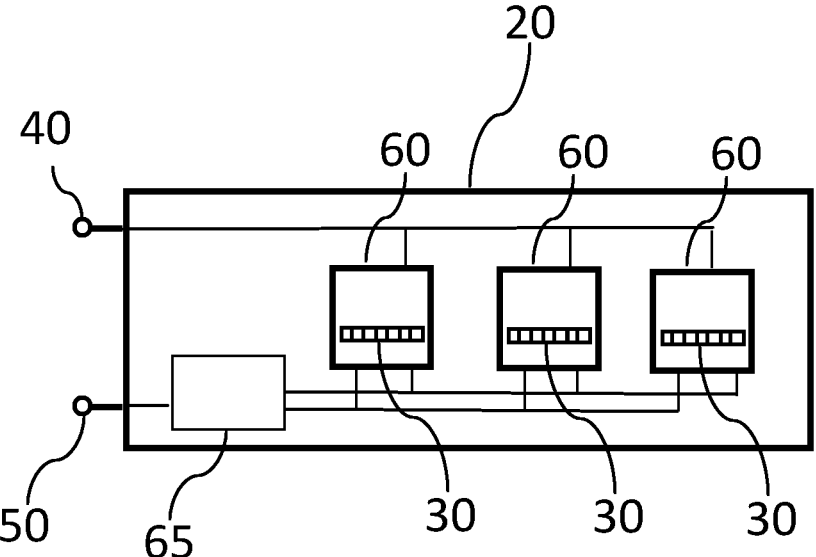
FIG. 6 represents schematically a detailed view of a power domain in a device according to the invention.

FIG. 6 represents schematically a power domain 20 in an embodiment of the invention, comprising a frequency divider module 65. The frequency divider module receives a clock from the clock generator module, and may divide the clock into a plurality of clocks having different frequencies, e.g. divided by 2, 4, 8 or other factors. The peripherals 60 may then select one of these divided clocks for clocking the peripheral, depending on the PCSR's 30.

Depending on the number of power domains and the nature and number of peripherals in each power domain, a number of operating modes may de defined. This number of operating modes may be fairly large, i.e. exceed a simple active/standby/sleep combination. The control logic module 136 comprised in the PMU is configured for translating the configuration of the peripherals, made by the application program, into a selected one of the operating modes, and for conveying the needed configuration of the voltages and clocks to the VGM 70 and/or to the clock generator module 100 and/or to the other required components 18. As an example, if all peripherals of a power domain are disabled, the PMU may clock gate all the peripherals by shutting off one or more of the clock generators 105, or if power-gating is available, the PMU may set the power gating switch 140 to 'off' if this corresponds to the target mode of operation.

EXAMPLE

We consider a microcontroller with multiple peripherals for communication purposes such as SPI, I2C, UART, for timing purposes such as timer, RTC, watchdog, for analog sensing purposes such as ADC, comparator, for security purposes such as AES, random number generator. The microcontroller is partitioned in three power domains. Power domain 1 includes the core of the microcontroller. Power domain 2 includes ADC, comparator, SPI, I2C, timer, watchdog, AES and random number generator. Power domain 3 includes RTC and UART. The microcontroller has two clock generators that generate a high and a low frequency. The microcontroller has two voltage generators that generate a high and a low voltage. The application program can configure each peripheral to be operated with a high or a low frequency. The core is supplied by a low voltage. The other peripherals are supplied with a high voltage. The microcontroller has four operating modes. Mode 1 has all domains powered and clocked, all clock generators activated and all voltage generators activated. Mode 2 has domain 1 powered but clock gated, domains 2 and 3 powered and clocked, all clock generators activated and all voltage generators activated. Mode 3 has domain 1 and 2 power gated, domain 3 powered and clocked, all clock generators activated and only high voltage generator activated. Mode 4 has domain 1 and 2 power gated, domain 3 powered and clocked, only low frequency clock generator activated and only high voltage generator activated.

At startup, the microcontroller is in mode 1. Then, when the user request by software to go to sleep, the PMU will check which functionalities are required. If the SPI is activated (thus required), the PMU will choose mode 2 (because SPI is not available in mode 3 and 4). If only UART is activated and a high frequency is selected, the PMU will choose mode 3 (because high frequency clock generator is still required). If only UART is activated and a low frequency is selected, the PMU will choose mode 4.

Figure 7:
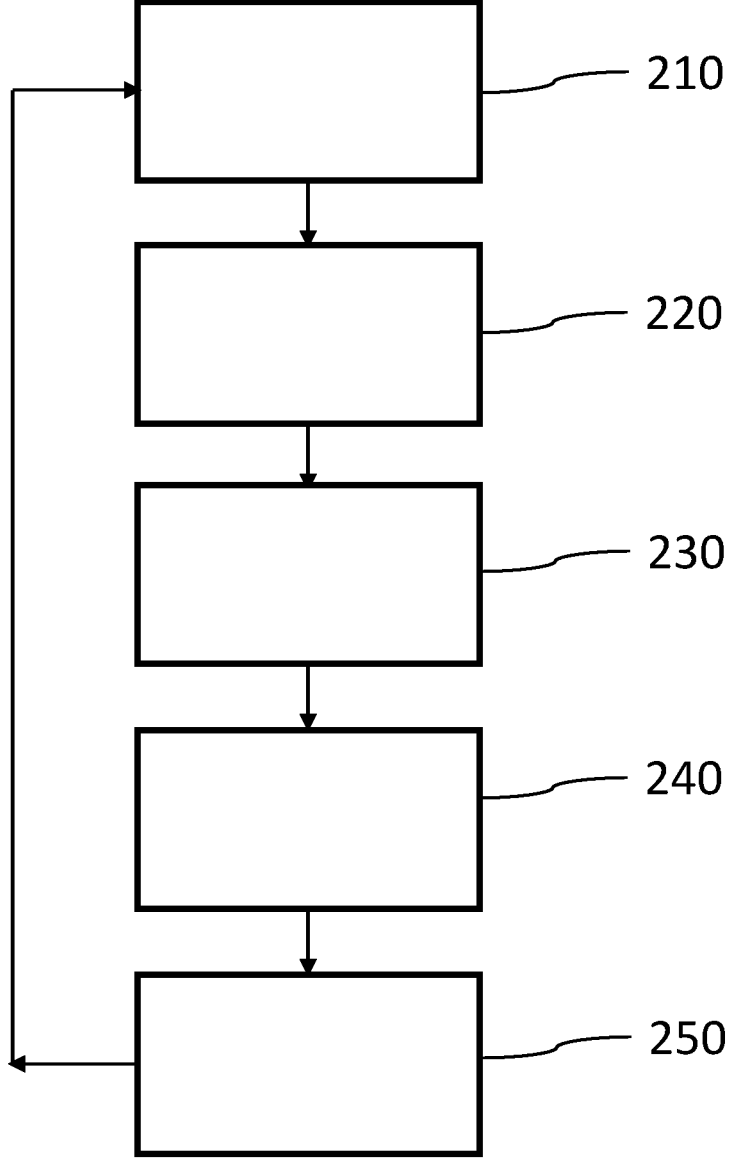
FIG. 7 represents a flow diagram of a method of operating a semiconductor device according to the invention.

FIG. 7 represents a flow diagram of a method of operating a semiconductor device according to the invention.

The semiconductor device of the invention may be operated as follows:

In step 210, the software application 14 configures the peripherals according to the needs of the application, i.e. some peripherals that are used or may be used may be enabled, and peripherals that are not used are disabled. The clocks may also be selected according to the needs of the application, e.g., if short response times or high throughput are needed, the faster clocks are selected. This may be performed by settings the bits of the PCSR's.

In step 220, when the application program decides that the conditions are satisfied in the context of the application to go to a 'sleep' operating mode (and thereby reduce the power needed) the application program may issue a sleep request, and send it or assert it to the PMU through a dedicated wire.

In step 230, the PMU then determines the configuration of the peripherals, e.g. by examining the values contained in the different PCSR's. This is performed by accessing each of the wires linking each of the bits of PCSR to the PMU or through bus access.

In step 240, the control logic module 136 comprised in the PMU then determines the operating mode in dependence of the configuration of the peripherals.

In step 250, the PMU 130 may send first and second commands and optionally third commands to the clock generator module, voltage generator module, and clock gating switches, respectively, thereby transiting the semiconductor device to a desired operating mode.

The semiconductor device goes back to normal mode when a wake up condition is received.

The sequence of steps may be repeated according to the operations performed by the software application.

By using the semiconductor device and method of the invention, a simple and efficient way to select and configure the operating modes of the device is provided. The application program only enables or disables the peripherals and selects the clock speed and/or the voltage to be used, according to the needs of the application. The task of determining how to configure the device is performed by the PMU, and the burden of deciding the optimal configuration of the operating modes is not on the application program.

The invention claimed is:

1. A semiconductor device (10) having a plurality of operating modes, comprising components (18) required for the operation of the semiconductor device having each an operating condition selectable among a plurality of operating conditions;

one or more peripherals (60) each configured to provide a functionality to the semiconductor device (10), according to a selected configuration among one or more configurations;

a core (12) adapted for executing a software application (14), said software application (14) being adapted for selecting the configuration of one or more of said peripherals (60) and for issuing a sleep request;

wherein the semiconductor device (10) further comprises a Power Management Unit (PMU) (130), having a first input port (132) for receiving the configuration of one or more of said peripherals, a second input port (134) for receiving a sleep request from said core (12) executing said software application (14), and a control logic module (136) configured for, upon receiving said sleep request, selecting an operating mode among said plurality of operating modes, in dependence of the configuration of one or more of said peripherals.

2. The semiconductor device (10) according to claim 1 wherein one or more of said peripherals (60) comprise a Peripheral Control and Status Register (PCSR) (30) comprising one or more bits, the one or more bits comprising a bit to set the peripheral (60) in operational on or off state, and for providing status information regarding the peripheral, the semiconductor device comprising a first bus (16) for exchanging data between said core (12) and said one or more of said peripherals (60), said software application (14) being adapted for selecting the configuration of one or more of said peripherals by sending data through said first bus (16).

3. The semiconductor device (10) according to claim 1 wherein one or more of said peripherals (60) comprise a clock input terminal (50) for receiving one or more clocks;

one of the said components (18) of the semiconductor device (10) is a clock generator module (100) comprising one or more clock generators (105) configured for producing and providing a clock to said clock input terminals (50) of said one or more peripherals (60), and configured for receiving first commands to turn on or turn off each of the clock generators (105) and/or to determine the frequency to be produced;

the PMU (130) is configured for, upon receiving said sleep request, sending said first commands in dependence of said selected operating mode, for setting said semiconductor device (10) in said selected operating mode.

4. The semiconductor device (10) according to claim 1 wherein the semiconductor device (10) comprises one or more power domain (20, 20'), each comprising one or more of said peripherals (60);

one or more of said one or more power domains (20, 20') further comprise a voltage input terminal (40) for receiving a voltage for powering the power domain (20, 20');

one of the said components (18) of the semiconductor device (10) is a voltage generator module (70) comprising one or more voltage generators (75) and voltage output terminals (80), configured each for producing and providing one voltage to at least one of said voltage input terminal (40) for powering said one or more power domains, and configured for receiving second commands to turn on or turn off each of the voltage generators and/or to determine the voltage to be produced;

the PMU (130) is configured for, upon receiving said sleep request, sending said second commands in dependence of said selected operating mode, for setting said semiconductor device (10) in said selected operating mode.

5. The semiconductor device (10) according to claim 3 wherein one wire for each of the clock generators (105) is provided between the PMU (130) and the clock generator for sending said first commands.

6. The semiconductor device (10) according to claim 3 wherein a second bus (17) is provided for exchanging data between said PMU (130) and said clock generator module (100), said PMU (130) and said clock generator module (100) being configured for sending and receiving, respectively, said first commands through said second bus (17).

7. The semiconductor device (10) according to claim 4 wherein one wire for each of the voltage generators (75) is provided between the PMU (130) and the clock generator for sending said second commands.

8. The semiconductor device (10) according to claim 4 wherein a second bus (17) is provided for exchanging data between said PMU (130) and said voltage generator module (70), said PMU (130) and said voltage generator module (70) being configured for sending and receiving, respectively, said second commands through said second bus (17).

9. The semiconductor device (10) according to claim 6, wherein said first bus (16) and said second bus (17) are interconnected so as to form a single bus.

10. The semiconductor device (10) according to claim 4, a power gating switch (140) being provided between a voltage output terminal (80) and a voltage input terminal (40), for providing power to the power domain when the switch is on, and for gating the voltage provided to said power domain when the switch is off; said power gating switch (140) being controlled by third commands, the PMU (130) being configured for, upon receiving said sleep request, sending said third commands in dependence of said selected operating mode, for setting said semiconductor device (10) in said selected operating mode.

11. The semiconductor device (10) according to claim 4, wherein one or more of said power domains comprise a frequency divider module (65) configured for receiving a clock from the clock generator module and for dividing said clock into a plurality of clocks having different frequencies.

12. A method of operating a semiconductor device according to claim 1, comprising:

1) Said software application (14) sets the configuration of one or more of said peripherals (60), according to the needs of the application;

2) Said software application (14) decides to transit to a different operating mode;

3) The PMU (130) collects the configuration of at least one of said peripherals (60); and 4) the control logic (136) of the PMU selects the operating mode of the semiconductor device, in dependence of the configuration of one or more of said peripherals (60).

13. The method according to claim 12, further comprising:

5) The PMU (130) sends said first and/or said second and/or said third commands in dependence of said selected operating mode.

14. The semiconductor device (10) according to claim 4 wherein one wire for each of the clock generators (105) is provided between the PMU (130) and the clock generator for sending said first commands.

15. The semiconductor device (10) according to claim 4 wherein a second bus (17) is provided for exchanging data between said PMU (130) and said clock generator module (100), said PMU (130) and said clock generator module (100) being configured for sending and receiving, respectively, said first commands through said second bus (17).

16. The semiconductor device (10) according to claim 8, wherein said first bus (16) and said second bus (17) are interconnected so as to form a single bus.

\* \* \* \* \*